J. W. CONNERY.
MODE OF CALKING BOILERS.
No. 7,288. Reissued Aug. 29, 1876.
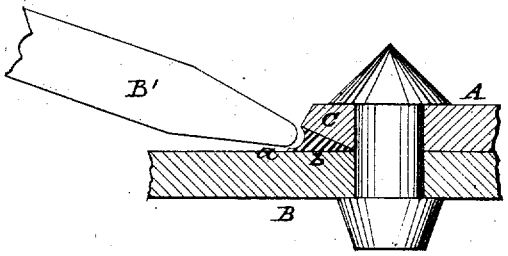
Witnesses.
James Morrell Jr
W. A. Harris
Inventor
James W. Connery
N. PETERS, PHOTO-LITHOGRAPHER, WASHINGTON, D. C.

UNITED STATES PATENT OFFICE.

JAMES W. CONNERY, OF PHILADELPHIA, PENNSYLVANIA.

IMPROVEMENT IN MODES OF CALKING BOILERS.

Specification forming part of Letters Patent No. 150,831, dated May 12, 1874; reissue No. 7,288, dated August 29, 1876; application filed October 29, 1875.

*To all whom it may concern:*

Be it known that I, JAMES W. CONNERY, of Philadelphia, in the county of Philadelphia and State of Pennsylvania, have invented a certain new and useful Improvement in Calking Boilers, Ships, and seams in metallic plates generally; and do hereby declare the following to be a full, clear, and exact description of my invention, such as will enable others skilled in the art to which it pertains to make and use it, reference being had to the accompanying drawings, which form part of this specification. in which is shown a section of a steam-boiler embracing my invention.

The object of this invention is an improved calking for seams of steam-boilers, tanks, and all kinds of vessels composed of, or covered with, wrought-metal plates; and it consists in the combination, in a boiler, tank, or analogous article having the joint between the overlapping plates calked or closed by compressing or upsetting the metal, of the edge of one plate against the side of the other, substantially as hereinafter described, so as to prevent cutting or forming a shoulder at the corner, and thereby obviating an initial fracture.

The principal advantages of this mode of calking are, that the indenting and consequent weakening of the lower plate, caused by the use of the ordinary or split calking-tool, is avoided, and that the metal at the edge of the upper plate is compressed, and a larger impinging surface produced than heretofore, according to the ordinary method.

The results obtained are, that a tighter seam is produced, and by avoiding the sharp indentation of the under plate, as in ordinary calking, there is less liability to breakage when exposed to steam, or to explosion when required to resist the action of steam.

Referring to the accompanying drawing, A represents the upper or overlapping, and B the under, plate of a steam-boiler or other vessel, or series of plates, the seams of which are calked according to my improvement. B′ designates the calking-tool, the body of which is of the usual or any suitable form, tapering or converging toward the point, which, instead of being beveled, or formed angular, has its edge smoothly and evenly rounded.

The manipulation of this tool is as follows: The convex edge of the tool is laid against the edge of the overlapping plate, and then driven with sufficient force to compress the metal, which it does, producing, as before observed, a concave channel, C. The tool is, of course, held at a proper inclination, so as to drive the metal toward the lower plate.

As the edge of the overlapping plate yields, the lower portion of the concave groove or depression gradually projects beyond the original line of the seam, and produces a lip or flange, *a*, while the metal behind the latter bulges downward or inward, toward the lower plate, and forms a continuation of the lip or flange, as clearly appears at *b*, in the drawing. In this way the seam is more tightly and evenly calked than by the ordinary method, while, as will be readily comprehended, no indentation or cutting of the lower plate whatever occurs.

The operation may be effectively performed by a single tool; but it may be found convenient and desirable, in some instances, to employ a set of different-sized tools, in which case the work would be commenced with the smallest and completed with the largest.

Having thus described my invention, what I claim as new, and desire to secure by Letters Patent, is—

1. The method of calking seams in metal, substantially as described.

2. The combination, in a boiler, tank, or analogous article, of overlapping plates having the calking herein described, the metal of the edge of one plate being compressed against the side of the other to prevent cutting, and thereby obviate an initial fracture, as set forth.

In testimony whereof I have hereunto set my hand this 9th day of October, A. D. 1875.

JAMES W. CONNERY.

Witnesses:

W. A. HARRY,
JAMES MORRELL, Jr.